Aug. 12, 1958  R. W. ASHLEY  2,847,331
HYDROGEN ISOTOPE TARGETS
Filed Dec. 24, 1954
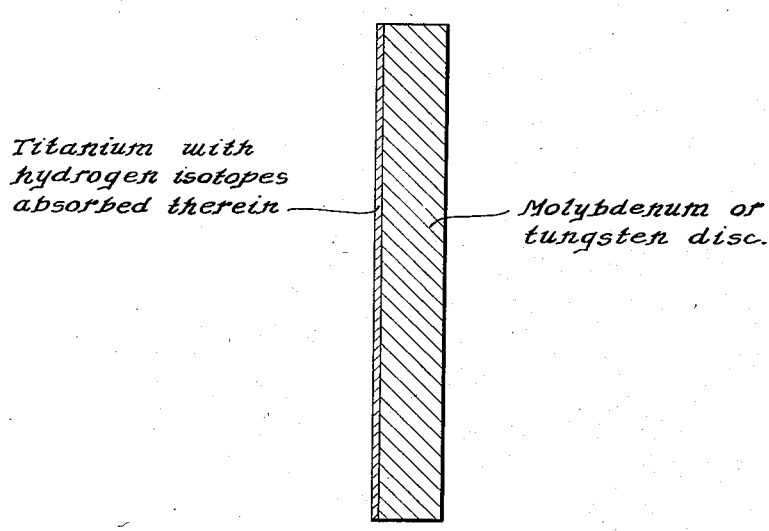
Titanium with hydrogen isotopes absorbed therein
Molybdenum or tungsten disc.
INVENTOR.
Robert W. Ashley
BY
Roland A. Anderson
Attorney

United States Patent Office 2,847,331
Patented Aug. 12, 1958

2,847,331

HYDROGEN ISOTOPE TARGETS

Robert W. Ashley, Deep River, Ontario, Canada, assignor, by mesne assignments, to the United States of America as represented by the United States Atomic Energy Commission Application December 24, 1954, Serial No. 477,595

4 Claims. (Cl. 117—220)

This invention relates to targets for use in the investigation of nuclear reactions of hydrogen isotopes by bombardment with accelerated particles.

The object of the invention is to provide a target having a metal backing and an adherent metal coating containing hydrogen isotopes.

The invention may be better understood by reference to the drawing which shows in cross section a hydrogen isotope target disc consisting of a backing of molybdenum or tungsten having a coating of titanium on the backing, and a hydrogen isotope absorbed in the coating.

In accordance with the invention molybdenum or tungsten is used as the backing of the target. Molybdenum is preferred since it is more readily degassed than tungsten. Titanium constitutes the coating and it is applied by evaporation to provide a film of desired thickness. A thickness of 0.2 to 5.0 mg. per square centimeter of the backing metal is found to be satisfactory. Titanium is readily amenable to evaporation and well adheres to the backing and upon heating it readily absorbs the hydrogen isotopes, deuterium and tritium.

In preparing the target the backing plate is cleaned by chemical or electrolytic treatment or by repeated heating and cooling in a vacuum. Titanium is evaporated on to the clean backing disc in a vacuum vessel under controlled temperature. Preferably the temperature is maintained at about 1500° C. until the pressure in the vessel is reduced to about 0.1 micron or less to clean the titanium. The temperature is then raised to evaporate the titanium and coat the disc which is allowed to cool to room temperature in the vacuum vessel. The amount of titanium evaporated on to the disc is determined by weighing the disc before and after evaporation. A coating of 0.2 to 5.0 mg. of titanium per square centimeter was found effective.

The titanium coated disc is then placed in a vessel evacuated to a pressure less than $5 \times 10^{-5}$ mm. of mercury and hydrogen isotope is admitted to a pressure of 40–50 mm. The coated disc is heated in the deuterium or tritium atmosphere at about 500° C. for 3–4 minutes and then allowed to cool to room temperature. The amounts of isotope occluded, calculated as an atomic ratio of gas to metal, varied usually from 1.0 to 1.7.

If the backing disc is not thoroughly cleaned the titanium coating does not adhere well and it disintegrates badly upon isotope adsorption. It has also been found that the titanium coating disintegrates on absorption of the isotope gas if the coated disc is heated at elevated temperature prior to absorption of the isotope. Such heating should be avoided. When evaporated on to the backing disc the titanium absorbs an adequate amount of the isotope and only thin films are required, thus economizing on the use of the isotope. The evaporated film of titanium is more easily controlled as to thickness and area covered than is the case with fused films.

What is claimed is:

1. A hydrogen isotope target comprising a backing disc of a metal selected from the group consisting of molybdenum and tungsten, a coating of condensed titanium on said disc, and a hydrogen isotope selected from the group consisting of deuterium and tritium absorbed in said coating.

2. A target as defined in claim 1 wherein the titanium coating consists of 0.2 to 5.0 mg. per square centimeter.

3. A target as defined in claim 2 wherein the atomic ratio of isotope to titanium is 1.0 to 1.7.

4. A method of preparing hydrogen isotope targets which comprises thoroughly cleaning a backing disc of a metal selected from the group consisting of molybdenum and tungsten, placing the disc in a closed vessel under vacuum in the presence of titanium metal, heating to evaporate the titanium to coat the disc, cooling the coated disc within the vacuum vessel, and heating the coated disc under vacuum in the presence of a hydrogen isotope selected from the group consisting of deuterium and tritium to cause absorption of the isotope by the heated coating, and maintaining the temperature at not substantially higher than 500° C. to prevent desorption of the isotope.

References Cited in the file of this patent

UNITED STATES PATENTS

| | | |
|---|---|---|
| 2,351,798 | Alexander | June 20, 1944 |
| 2,711,973 | Wainer et al. | June 28, 1955 |